United States Patent

Miyoshi et al.

[11] Patent Number: 5,909,613
[45] Date of Patent: *Jun. 1, 1999

[54] APPARATUS FOR REMOVING HARMFUL GAS

[75] Inventors: Noriomi Miyoshi; Kazuteru Shinkai; Toshiharu Sasamoto; Hitomi Kawakami, all of Kanagawa; Satoshi Nishikata, Kawasaki, all of Japan

[73] Assignee: Fuji Electric Co., Ltd., Kawasaki, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/439,986

[22] Filed: May 12, 1995

Related U.S. Application Data

[63] Continuation of application No. 08/131,735, Oct. 5, 1993, abandoned.

[30] Foreign Application Priority Data

Oct. 6, 1992 [JP] Japan .................................. 4-292147
Dec. 1, 1992 [JP] Japan .................................. 4-345504

[51] Int. Cl.$^6$ .................................................. B01J 19/12
[52] U.S. Cl. ........................ 422/186; 422/141; 422/143; 422/144; 422/146; 422/168; 422/173; 422/177; 422/178; 422/186.3; 422/193; 422/198; 422/223; 422/239
[58] Field of Search ..................................... 422/168, 173, 422/174, 177, 178, 186, 213, 216, 223, 239, 139, 141, 143, 144, 146, 186.3, 193, 198; 423/235, 239, 242.1, 244.01, 244.1

[56] References Cited

U.S. PATENT DOCUMENTS

| | | | |
|---|---|---|---|
| 2,459,425 | 1/1949 | Hemminger | 422/213 |
| 3,094,478 | 6/1963 | Harped | 422/223 X |
| 4,003,711 | 1/1977 | Hishinuma et al. | 422/178 |
| 4,005,017 | 1/1977 | Kusano et al. | 422/178 X |
| 4,152,162 | 5/1979 | Masuda et al. | 430/620 |
| 4,940,567 | 7/1990 | Ohlmeyer et al. | 422/213 X |
| 4,997,576 | 3/1991 | Heller et al. | 210/748 |
| 5,102,628 | 4/1992 | De Lasa | 422/239 X |
| 5,158,754 | 10/1992 | Leters et al. | 422/143 |

FOREIGN PATENT DOCUMENTS

| | | |
|---|---|---|
| 0 325 133 | 7/1989 | European Pat. Off. . |
| 0 441 111A1 | 8/1991 | European Pat. Off. . |
| 35 35 172A1 | 4/1987 | Germany . |
| 61-133 125 | 6/1986 | Japan . |
| 63-042 792 | 2/1988 | Japan . |
| 63-315138 | 12/1988 | Japan . |
| 1-159032 | 6/1989 | Japan . |
| 1-159033 | 6/1989 | Japan . |
| 1-218622 | 8/1989 | Japan . |
| 3-233100 | 10/1991 | Japan . |
| 91 00241 | 1/1991 | WIPO . |

*Primary Examiner*—Hien Tran
*Attorney, Agent, or Firm*—Finnegan, Henderson, Farabow, Garrett & Dunner, L.L.P.

[57] ABSTRACT

A method of removing harmful gas is performed by a manner that a mixture of photocatalyzer and active carbon with air containing harmful gas and the mixture of photocatalyzer and active carbon are mixed in a chamber so as to drift the mixture in the air, the drifting mixture reacting with the harmful gas in illumination by lighting means, and the mixture catching said harmful gas so as to remove said harmful gas.

10 Claims, 4 Drawing Sheets

APPARATUS FOR REMOVING HARMFUL GAS

This application is a continuation of application Ser. No. 08/131,735, filed Oct. 5, 1993, now abandoned.

BACKGROUND OF THE INVENTION

The present invention relates to a method for removing harmful constituents from a gas, and respectively to a method for removing NOx and SOx of low density from air.

Regarding the harmful gas removal apparatus, various oxidation or reduction catalyzers to treat discharged gas from motor vehicles, power plants or the like have been developed. Those harmful gas removal apparatus are constructed to be operable for high density harmful gases of several hundreds ppm and at high temperatures of several hundreds to 1000° C. In design, the removal of low density harmful gases of several ppm from the air is not taken into consideration.

A method of removing trace amounts of harmful gas from air has been developed (e.g., Published Unexamined Japanese Patent Application No. Hei. 1-218622). Also a ventilation system for car road tunnels using harmful gas removal method has been developed (e.g., Published Unexamined Japanese Patent Application No. Hei. 3-233100).

The harmful gas removal method is based on the fact that when a mixture of titanium dioxide ($TiO_2$) and active carbon or a mixture of the former and iron series metal oxide ($Fe_2O_3$, NiO, ZnO, etc.) is illuminated with light, NOx and SOx of low density can efficiently be removed at room temperature. This method is able to remove low density harmful gases of several ppm or less in the air without any additional process, for example, a heating process, at low cost.

In this method, it could be considered that titanium dioxide or iron series metal oxide as the photocatalyzer is activated by light applied thereto. The activated photocatalyzer cooperates with the active carbon to convert the harmful gas to another material, for example, NOx to nitric acid ions ($NO_3^-$) and SOx to $SO_4^{2-}$, and catches the converted material. The mixture of the photocatalyzer and active carbon (referred to simply as photocatalyzer herein after) is gradually deteriorated in its activity since reactive product is deposited thereon. However, after the reactive product is washed away from the photocatalyzer by water, and the photocatalyzer is dried, the photocatalyzer can be used again.

In these harmful gas removal methods the photocatalyzer, as shaped grains, is fixed on the adhesive-coated surface of a fixed member, and thus, the photocatalyzer is brought into contact with harmful gas in a fixed state.

An apparatus for realizing the harmful gas removal method as just mentioned is illustrated in FIG. 5. As shown, a photocatalyzer layer 2 is layered on one side of the inner wall of an upright reactive chamber 1. Light sources 3 for illuminating the photocatalyzer layer 2 are provided on the other side of the inner wall. A series of nozzles 4 and a heater 5 for drying the photocatalyzer layer 2 are disposed along the photocatalyzer layer 2 within the reactive chamber 1. A washing water tank 7 is placed under the reactive chamber 1, with a valve 6 interconnecting them.

The gas subjected to the treatment is fed into the reactive chamber 1 through an inlet 8 formed at the top of the chamber. Within the chamber, the gas comes in contact with the photocatalyzer layer 2 by which the harmful gas is removed from the gaseous body. The gas thus cleaned is discharged from an outlet 9 formed in the lower portion of the chamber. When reactive product is deposited on the photocatalyzer layer 2 and the activity of the layer deteriorates to a certain degree, the feeding of the gas is stopped. The photocatalyzer layer 2 is washed by water spouted out of the nozzles 4, and then dried by the heater 5. The water dropping from the photocatalyzer layer is collected in the tank 7 through the opened valve 6. The thus collected water, if necessary, is processed for harmful contents removal and discharged as waste water.

The harmful gas removal apparatus thus constructed has the following problems.

(1) The regaining process of restoring the deteriorated photocatalyzer layer by the washing and drying operations must be performed within the reactive chamber since the photocatalyzer layer is fixed in the chamber. When the washing device (nozzles 4 in the above example) and the drying device (heater 5) are installed within the reactive chamber, these devices must be laid out so as not to interrupt the air flow and the passage of light from the light sources 3. Thus, proper arrangement of these devise results in complexity of the apparatus.

(2) The fixed side of the photocatalyzer layer in contact with the inner wall of the chamber is not subjected to reaction with the harmful gas. And it is very difficult to uniformly illuminate the wall of the chamber on which the photocatalyzer layer is fastened with light from the light sources. Accordingly, the reaction process is inefficient.

(3) To increase the contact area of the photocatalyzer, the surface area of the fixed member must be increased. The result is apt to increase the size of the harmful gas removal apparatus. It is difficult to increase the contact area of the photocatalyzer while reducing the apparatus size.

(4) The reaction process must be stopped during the photocatalyzer regaining process.

(5) Removal of the deteriorated photocatalyzer and placement of fresh photocatalyzer are not easy.

SUMMARY OF THE INVENTION

An object of the present invention is to provide a method and apparatus for removing harmful gas, which eliminates the above-mentioned problems arising during the process of removing harmful gas constituents from a gas using photocatalyzer.

To achieve the above object, in the present invention, a drifting mixture of photocatalyzer and active carbon as shaped grains are brought into contact with air containing a harmful gas.

Further, in the invention, air containing harmful gas is passed through groups each consisting of a number of globular bodies with each body fixing a mixture of photocatalyzer and active carbon on the surface thereof, and the globular bodies drift with the air fed thereto to bring the harmful gas into contact with the photocatalyzer. The method may be executed by an apparatus constructed such that a number of globular bodies each fixing a mixture of photocatalyzer and active carbon on the surface thereof, and a light source for illuminating the globular bodies with light emitted therefrom are disposed within a reactive chamber allowing air to pass therethrough, and air containing harmful gas is fed to the reactive chamber from the bottom thereof and discharged out of the reactive chamber from the top thereof. In the apparatus, nozzles for spouting forth washing water to the globular bodies may be provided in the upper portion of the reactive chamber.

The photocatalyzer may be titanium dioxide ($TiO_2$) or a mixture of titanium dioxide and iron series metal oxide, such as iron sesquioxide ($Fe_2O_3$), copper oxide ($Cu_2O$), nickel oxide (NiO), and zinc oxide (ZnO). One or more number of iron series metal oxides may be used. The light source capable of emitting light of 400 nm or shorter in wavelength is used.

In the present invention, the photocatalyzer is not fixed in position. That is, photocatalyzer grains are brought into contact with air containing harmful gas while drifting with the flow of the air. Alternatively, the globular bodies each fixing photocatalyzer on the surface thereof, are fluidized by the air fed thereto to bring the harmful gas into contact with the photocatalyzer. When the activity of the photocatalyzer grains or the photocatalyzer globular bodies is deteriorated, the photocatalyzer is removed and subjected to a restoring process. Accordingly, a reaction section where the photocatalyzer reacts with harmful gas and a regaining section where the used photocatalyzer is washed and dried are separately provided in the harmful gas removal apparatus. If the apparatus is so constructed, the reaction section is simple in construction because the washing device and the drying device are not installed in the reaction section. In the regaining section, photocatalyzer grains or photocatalyzer globular bodies can be collected in the same place and processed there. Accordingly, the process of restoring the activity of the photocatalyzer and the replacement of the used photocatalyzer with fresh photocalalyzer can be carried out readily and reliably.

The surfaces of the photocatalyzer brought into contact with the harmful gas are provided by the combination of the surfaces of the photocatalyzer grains and globular bodies. The contact area of the photocatalyzer of the invention is larger than that of the photocatalyzer when the photocatalyzer is fastened onto the planar surface of a fixed member. Further, the photocatalyzer grains on the globular bodies are in a drifting or fluidized state. The photocatalyzer is uniformly contacted by the harmful gas and is uniformly illuminated with light from the light source. The reaction process is thus highly efficient.

Furthermore, with the separation of the reaction section and the regaining section, the reaction of the photocatalyzer with the harmful gas can be continued while the deteriorated photocatalyzer is processed restore its activity.

DETAILED DESCRIPTION OF THE PREFERRED EMBODIMENTS

EXAMPLE 1

Figure 1:
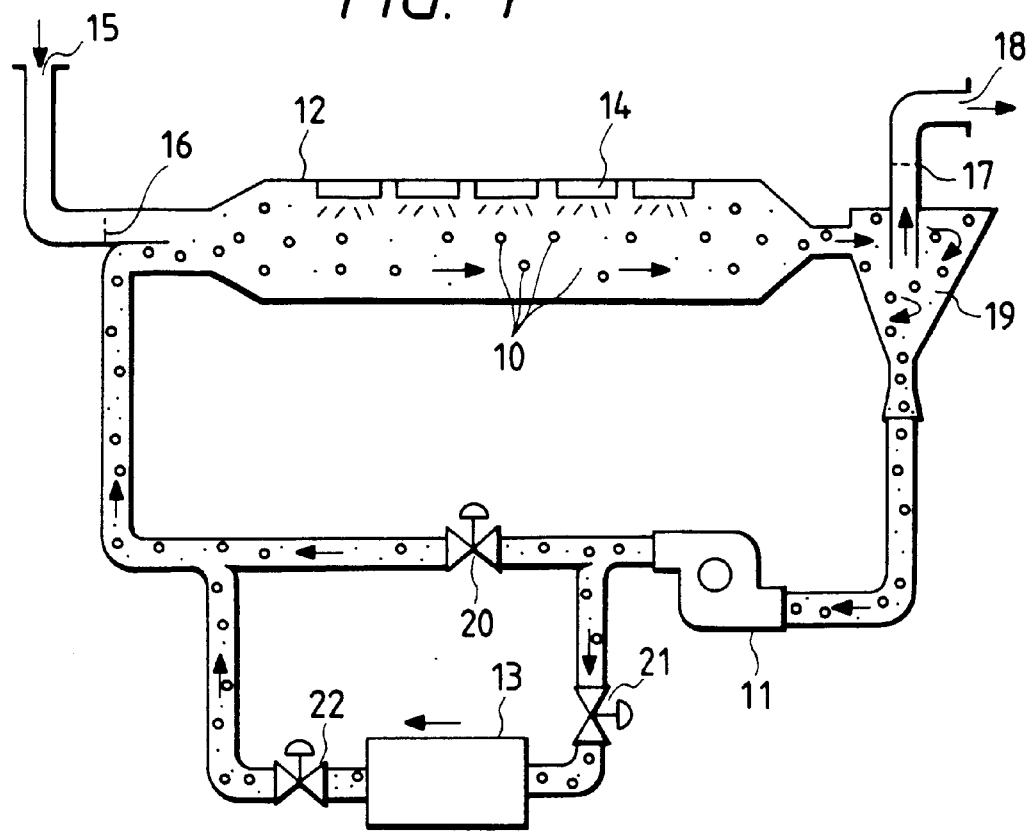
FIG. 1 is a schematic diagram of a harmful gas removal apparatus according to an example of the present invention.

FIG. 1 shows an example of the present invention in which photocatalyzer in the form of grains are brought into contact with harmful gas in the air while in a fluidized or drifting state. In the apparatus, photocatalyzer grains 10, consisting of titanium dioxide, a mixture of active carbon and iron series metal oxide ($Fe_2O_3$, $Cu_2O$, NiO, ZnO, and the like) drift along with a stream of air caused by a blower 11 to circulate through a loop including a tubular reactive chamber 12 and a regaining device 13. A series of light sources 14, illuminating and activating the photocatalyzer grains 10, are disposed within the reactive chamber 12.

The air containing NOx and SOx is fed by a blower (not shown) into the reactive chamber from an inlet 15 through a filter 16, and passes through the reactive chamber 12, and is discharged through a filter 17, to an outlet 18. When flowing within the reactive chamber 12, the air comes in contact with fluidized photocatalyzer grains 10 drifting within the reactive chamber. NOx and SOx in the air react with the photocatalyzer, which are activated by light from the light sources, to be oxidized into oxidization products, such as nitric acid ions and sulfuric acid ions, further into nitrate or sulfate products to be coupled with iron series metal oxide, so that the reaction products adhere to the surfaces of the photocatalyzer grains 10. The photocatalyzer grains 10 are separated from the discharged air by a cyclone separator 19 located at the outlet of the reactive chamber 12.

The air path derived from the blower 11 is branched into two paths. In normal stage, an electromagnetic valve 20 is closed, and electromagnetic valves 21 and 22 located before and after the regaining device 13 are opened, so that the reaction process of photocatalyzer grains 10 with the harmful gas is performed while the used photocatalyzer grains 10 are treated for restoring the activity of the photocatalyzer. For the maintenance of the regaining device 13, the electromagnetic valves 21 and 22 are closed. At this time, if the electromagnetic valve 20 is left open, the reaction process can be continued.

Capability of emitting light of 300 to 400 nm in wavelength is required for the light sources 14. A mercury bulb, xenon lamp, black light or the like may used for the light sources 14. The grain diameter of the photocatalyzer grains 10 is preferably within the range of approximately 1 $\mu$m to 1 mm, depending on the rate of flow of the air being processed.

The regaining device 13 washes the used photocatalyzer grains 10 to remove the reaction products and dries the cleaned photocatalyzer grains 10. For example, it may be constructed such that after showered with washing water, the photocatalyzer grains 10 are exposed to hot air. In a case where, as the result of repeatedly using the photocatalyzer grains 10, the grains are too deformed to be properly fluidized, the deformed grains are replaced with fresh photocatalyzer grains. The water discharged from the regaining device 13 contains the reaction products, and the hydrogen ion concentration pH of the discharged water is adjusted to an allowable level, and drained off.

Gas/solid separation devices for separating photocatalyzer grains 10 from the air after removal of the harmful gas may be an electric dust collector, bag filter or the like, in addition to the cyclone separator 19. In the above-mentioned embodiment, the reactive chamber 12 is of the horizontal style, but may be of the vertical style where the installation space is limited, and easy maintenance is required.

EXAMPLE 2

Figure 2:
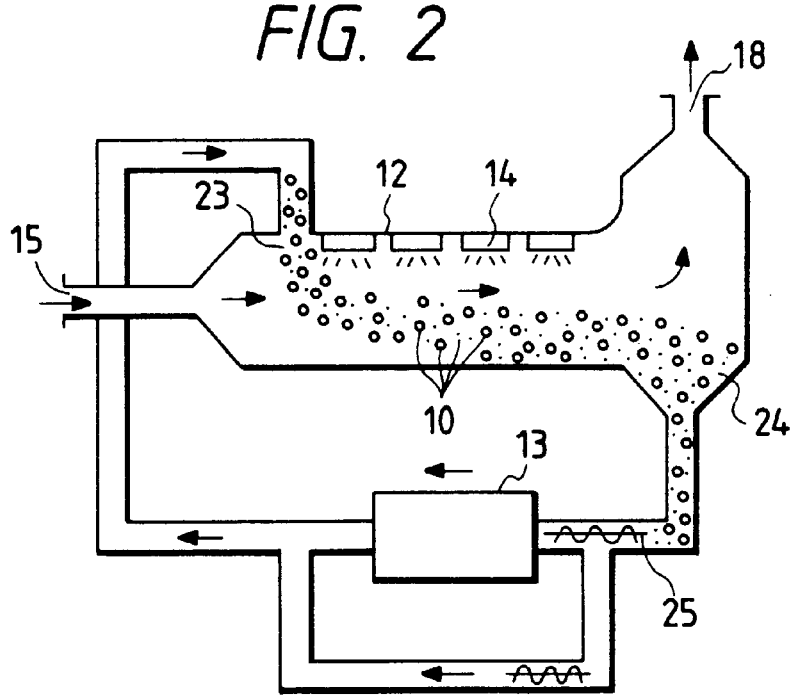
FIG. 2 is a schematic diagram of a harmful gas removal apparatus according to another example of the present invention.

FIG. 2 shows another example of the present invention in which photocatalyzer in the form of grains are brought into contact with harmful gas in the air while drifting with the flow of the air. In this example, in the reactive chamber 12 through which air to be treated passes, photocatalyzer grains 10 freely fall from input port 23 and are received and collected at a collecting port 24. The grain diameters of the photocatalyzer grains 10 and a rate of flow of the processed air may be properly selected so that the photocatalyzer grains falling from port 23 are carried by the stream of processed air going from the inlet 15 toward the outlet 18, and are collected at the collecting port 24. During the travel of the photocatalyzer grains 10, harmful gas contained in the air reacts with the photocatalyzer grains, so that the harmful gas is removed from the processed air.

The photocatalyzer grains 10 collected at the collecting port 24 are conveyed by a conveyor line 25, such as a belt conveyor or a screw conveyor, to the regaining device 13 where its activity is restored. The restored photocatalyzer grains 10 are transported to the port 23 to be used again for harmful gas removal. As in the first example, the regaining device 13 is coupled with a by-pass line. This example is advantageous in that a special air/solid separating device is not required.

In the constructions of the harmful gas removal apparatuses, as mentioned above, the reactive chamber 12 as a reaction section where the photocatalyzer grains 10 are brought into contact with the treated air, is provided separately from the regaining device 13 as a regaining section where the photocatalyzer grains 10 of deteriorated activity are washed by water and dried. The structures of these sections are simplified, so that the size of the overall apparatus is small. As a result, reliable reaction and restoring processes are ensured. Further, the apparatus can continuously run the reaction process since the restoring process of the photocatalyzer grains 10 does not disturb the reaction process. Additionally, the surface area of the photocatalyzer grains 10 is large to enhance the reaction process. The photocatalyzer grains 10 come in contact with the processed air while in drifting or fluidized state within the reactive chamber. Therefore, the reaction efficiency is good.

EXAMPLE 3

Figure 3:
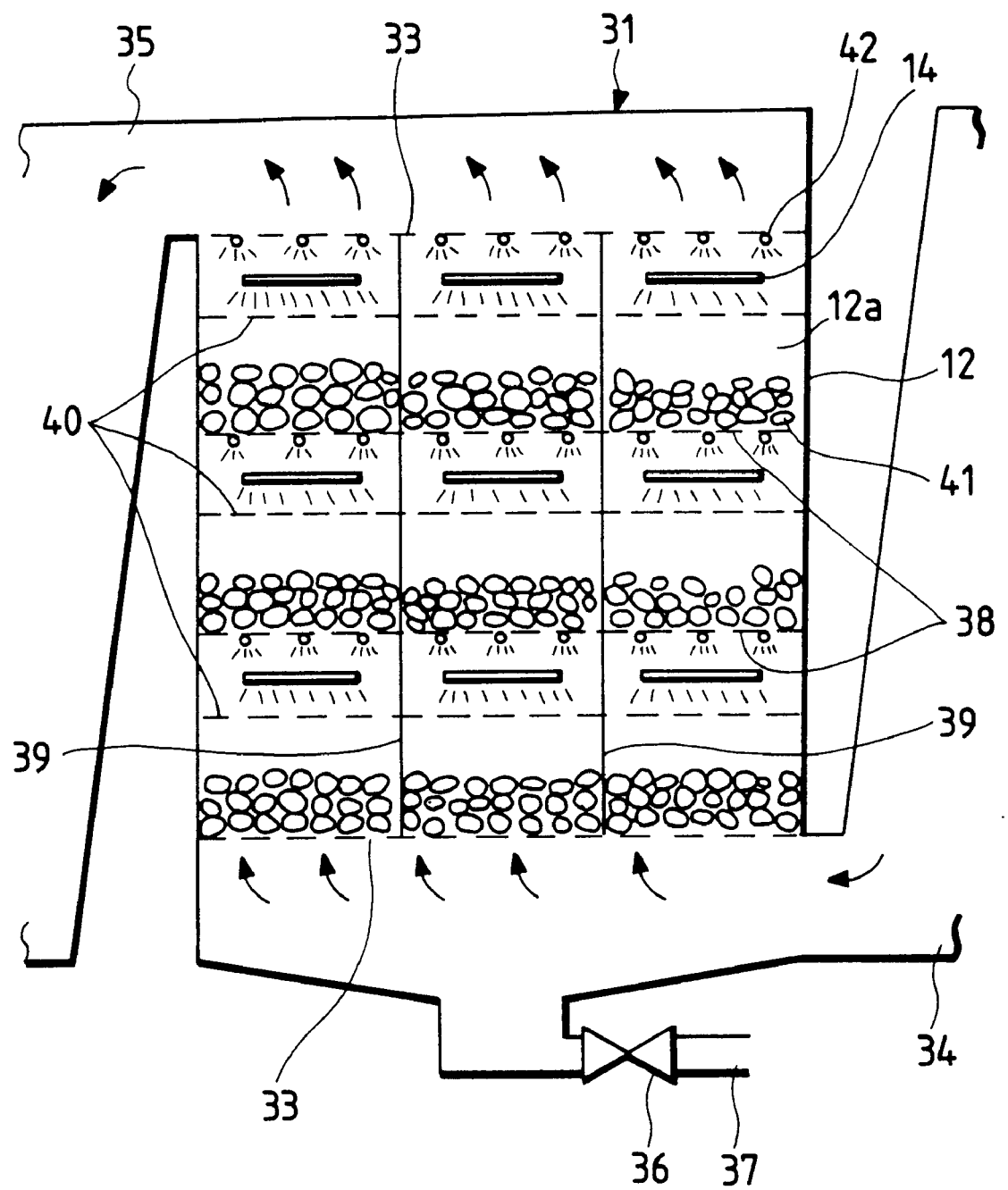
FIG. 3 is a schematic diagram showing a harmful gas removal apparatus according to a further embodiment of the present invention.
Figure 4:
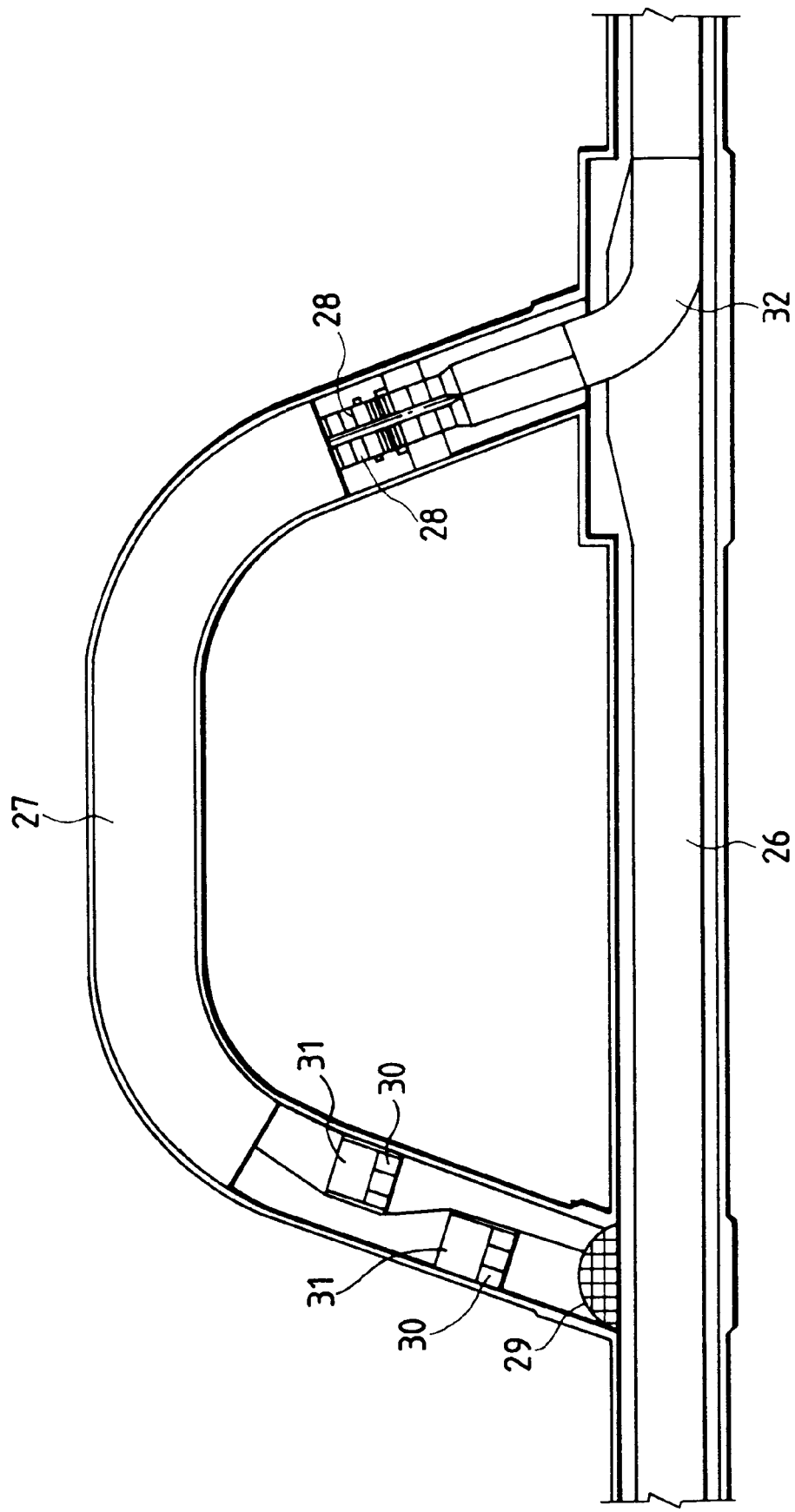
FIG. 4 is a fragmentary view of a ventilation system using the harmful gas removal apparatus and installed in a vehicle tunnel.
Figure 5:
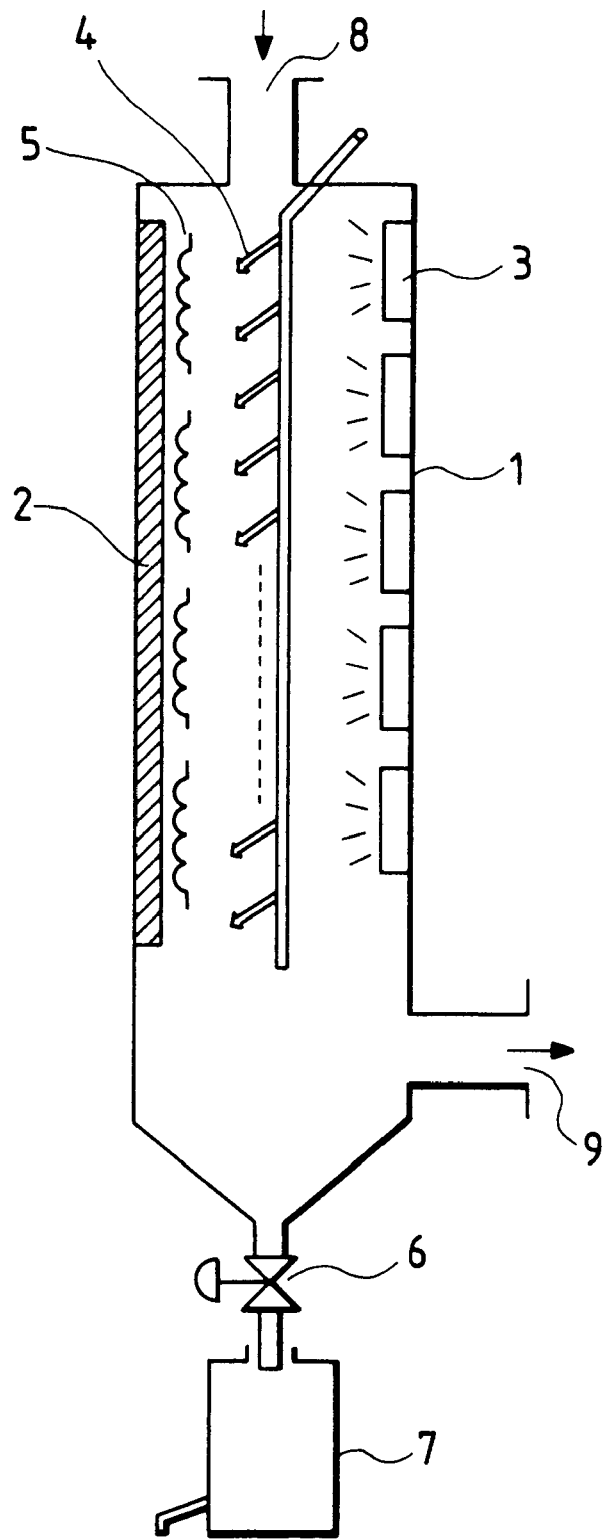
FIG. 5 is a diagrammatic view showing a conventional harmful gas removal apparatus.

FIGS. 3 and 4 cooperate to show an example of the present invention in which a number of globular bodies photocatalyzer on the surfaces, thereof are fluidized within a reactive chamber, and the photocatalyzer on the surfaces of the globular bodies come in contact with the harmful gas. FIG. 3 is a longitudinal sectional view showing a harmful gas removal apparatus according to a further embodiment of the present invention. FIG. 4 is an arrangement showing a ventilation system using the harmful gas removal apparatus when it is installed in a vehicle tunnel.

In FIG. 4, a by-pass tunnel 27 is provided along a section of vehicle tunnel 26. Contaminated air within the tunnel 26 is guided into the by-pass tunnel 27 through a suction port 29 by means of a blast fan 28. The contaminated air thus guided into the tunnel 27 enters an electric dust collector 30 where particles of soot are removed from the contaminated air. The contaminated air emanating from the electric dust collector 30 then enters a harmful gas removal apparatus 31 where the harmful gas is removed from the air. The thus cleaned air is returned to the upper space of the tunnel 26 through a blast duct 32 connecting to the blast fan 28. The space in the by-pass tunnel 27 between the harmful gas removal apparatus 31 and the blast fan 28, is divided into an upper space and a lower space by a partition, not shown. The upper space is used for an air flow path, while the lower space is used for an auxiliary machine room and an electric control room.

In FIG. 3, the harmful gas removal apparatus 31 includes a reactive chamber 12 having four side walls and top and bottom openings covered with nets 33. Air flows through the net-covered top and bottom openings. The bottom of the reactive chamber 12 is connected to the exhaust port of the electric dust collector 30 shown in FIG. 4, through a suction duct 34. The top of the reactive chamber 12 is opened into the space within the by-pass tunnel 27, by way of an exhaust duct 35. An exhaust port 37 under control of an electromagnetic valve 36 is formed in the bottom of the suction duct 34.

The space in the reactive chamber 12 is horizontally segmented into three spaces one above another by nets 38. Further, it is vertically segmented into three spaces by vertical separators 39. Thus, the inner space of the chamber 12 is divided into a total of 27 small spaces 12a. Each of small spaces 12a is further divided into the upper and lower spaces by a horizontal net or mesh 40. The lower space of each small space 12a contains a number of globular bodies 41, which carry photocatalyzer on their surfaces, are piled up to about half of the height of the lower space. Light sources 14, emitting light of 300 to 400 nm in wavelength toward the globular bodies 41, are located near to the middle of each upper space of the small space 12a. Nozzles 42 for spouting forth water toward the globular bodies 41 are provided above the light sources 14 in the upper space of each small space.

Each of globular bodies 41 of photocatalyzer is a hollow ball of 20 to 50 mm in diameter, made of synthetic resin. The surface of each globular body is smeared with powder, of sub-micron particle size, comprising a mixture of titanium dioxide, active carbon and iron series metal oxide. Air, still containing harmful gas of NOx and SOx after the sooty matter is removed therefrom by the electric dust collector 30, is fed through the suction duct 34 into the harmful gas removal apparatus 31, as indicated by arrows. The air passes through the nets 33, 38, and 40 within the reactive chamber 12 from the bottom to the top, and is exhausted from the exhaust duct 35. When the air flows in the chamber, the globular bodies 41 are fluidized.

The NOx, SOx and the like contained in the air passing through the reactive chamber 12 are oxidized by the photocatalyzer reacting therewith when activated by light from the light source, so that the products resulting from the oxidization are retained on the surfaces of the globular bodies 41. Since the globular bodies 41 are fluidized, light from the light sources 14 uniformly illuminates the entire surfaces of the globular bodies 41, and the harmful gas also uniformly contacts the entire surfaces of the globular bodies 41.

When the activity of the photocatalyzer deteriorates, the reaction is stopped. The surfaces of the globular bodies 41 are washed with water sprayed from the nozzles 42. The reaction products caught by the photocatalyzer are washed away from the globular body surfaces by water, so that the globular bodies 41 of photocatalyzer recovers its normal activity. The washing water drains through the suction duct 34 and the opened electromagnetic valve 36, and is collected in a water disposal tank, not shown, from the exhaust port 37. In the tank, the waste water is neutralized and exhausted.

It is noted that the surfaces of the globular bodies 41 serve as the contact area of photocatalyzer, so that this contact area is larger than that of the planar surface of the wall of the reactive chamber. It is noted further that the surfaces of the fluidized globular bodies 41 are uniformly illuminated with light from the light sources 14 and come in contact with the harmful gas in a similar way. With these advantageous features, the reaction process efficiently progresses.

Further, the globular bodies 41 may be taken out of the chamber to be washed and, when damaged, may be replaced with new ones in an easy manner.

The globular bodies 41, as hollowed balls may be made of porous material, if floatable. The shape of the globular bodies 41 need not be perfectly spherical.

As was described above, the photocatalyzer takes the form of grains of a mixture of photocatalyzer and active carbon or a number of globular bodies bearing photocatalyzer on the surfaces thereof. The grains or globular bodies of photocatalyzer are brought into contact with harmful gas in a state that they are fluidized or drifting. The present invention thus constructed has the following advantages when compared with the conventional harmful gas removal methods or apparatus in which photocatalyzer is layered on the surface of a fixed member.

(1) The harmful gas removal apparatus may be constructed with separate sections, a reaction section where the photocatalyzer reacts with harmful gas and a regaining section where the used photocatalyzer is washed and dried. Accordingly, the construction of each section is simple.

(2) The photocatalyzer is uniformly illuminated with light, and is uniformly contacted by the harmful gas. The reaction efficiency therefore is good.

(3) The surface areas of the grains of photocatalyzer and the globular bodies of photocatalyzer are large. An apparatus small in size and large in contact area is realized.

(4) The restoring process may be continued while the reaction process progresses. The apparatus operates efficiently.

(5) The deteriorated photocatalyzer can be removed and replaced with fresh photocatalyzer in a simple way.

What is claimed is:

1. An apparatus for removing harmful gas in which carriers having a photocatalyzable compound are brought in contact with air containing harmful gas to remove the harmful gas, comprising:

a reaction chamber that accommodates carriers, having a photocatalyzable compound, together with at least one light source, wherein said reaction chamber is vertically sectioned into a plurality of cells by vertical separators wherein carriers are disposed in each of the cells, and each of said cells has means for sprinkling washing water to said at least one light source and said carriers, and wherein said carriers float in each of said cells by ventilation, said apparatus configured to allow the air containing the harmful gas to pass from a lower side of said reaction chamber toward an upper side thereof for ventilation.

2. An apparatus according to claim 1, wherein the photocatalyzable compound is grain-shaped titanium dioxide.

3. An apparatus according to claim 1, wherein the photocatalyzable compound is a mixture of grain-shaped titanium dioxide and iron series metal oxide.

4. An apparatus according to claim 1, wherein the carriers are spherical.

5. An apparatus according to claim 4, wherein the spherical carriers are hollow.

6. An apparatus according to claim 4, wherein the spherical carriers are 20 to 50 mm in diameter.

7. An apparatus according to claim 5 or 6, wherein the spherical carriers are made of synthetic resin.

8. An apparatus according to claim 1, wherein each of the cells is further horizontally sub-sectioned into two sub-cells so that the carriers are disposed in a lower sub-cell, and the light source and the nozzle are disposed in an upper sub-cell.

9. The apparatus of claim 1 wherein said means for sprinkling washing water is at least one nozzle.

10. The apparatus of claim 8 wherein said cells are horizontally sub-sectioned by meshes or nets.

* * * * *